United States Patent
Rouwens et al.

(10) Patent No.: US 9,759,268 B2
(45) Date of Patent: Sep. 12, 2017

(54) DEVICE FOR LIMITING TORQUE AND FARM MACHINE USING SAME

(71) Applicant: KUHN S.A., Saverne (FR)

(72) Inventors: Julien Rouwens, Saverne (FR); Damion Babler, Albany, WI (US); Bernard Wattron, Haegen (FR)

(73) Assignee: KUHN S.A., Saverne (FR)

( * ) Notice: Subject to any disclaimer, the term of this patent is extended or adjusted under 35 U.S.C. 154(b) by 10 days.

(21) Appl. No.: 14/779,617

(22) PCT Filed: Mar. 24, 2014

(86) PCT No.: PCT/FR2014/050687
§ 371 (c)(1),
(2) Date: Sep. 24, 2015

(87) PCT Pub. No.: WO2014/154991
PCT Pub. Date: Oct. 2, 2014

(65) Prior Publication Data
US 2016/0053819 A1    Feb. 25, 2016

(30) Foreign Application Priority Data
Mar. 28, 2013 (FR) ..................................... 13 52826

(51) Int. Cl.
*F16H 35/10* (2006.01)
*F16D 9/06* (2006.01)
*A01D 43/00* (2006.01)

(52) U.S. Cl.
CPC .............. *F16D 9/06* (2013.01); *A01D 43/00* (2013.01)

(58) Field of Classification Search
CPC . F16D 9/06; F16D 7/024; A01D 43/00; F25B 23/141
USPC ........................ 74/412 TA, 15.66; 403/2, 361
See application file for complete search history.

(56) References Cited

U.S. PATENT DOCUMENTS

| | | | |
|---|---|---|---|
| 1,574,466 A * | 2/1926 | Brown ....................... | F16D 9/06 411/389 |
| 2,084,862 A | 6/1937 | Moser | |
| 4,086,012 A * | 4/1978 | Buckley .................... | B63B 1/28 114/279 |
| 4,758,109 A * | 7/1988 | Little ........................ | F16D 9/06 403/2 |

(Continued)

OTHER PUBLICATIONS

International Search Report issued Jul. 23, 2014 in PCT/FR2014/050687 Filed Mar. 24, 2014.

*Primary Examiner* — Zakaria Elahmadi
(74) *Attorney, Agent, or Firm* — Oblon, McClelland, Maier & Neustadt, L.L.P.

(57) ABSTRACT

A torque-limiting device for secure transmission of a rotation between an inlet baseplate and an outlet baseplate, including at least one drive bolt that forms a breaking element by shearing in case of a torque exceeding a predetermined threshold, and an intermediate baseplate that is driven by the inlet baseplate and which in turn drives the outlet baseplate. The at least one bolt ensures driving of the intermediate baseplate and the inlet baseplate or the outlet baseplate. The intermediate baseplate includes at least one locking element by shape cooperation with a locking part of the bolt, and the torque-limiting device has a larger number of locking elements than of bolts. An agricultural machine can include such a torque-limiting device.

9 Claims, 7 Drawing Sheets

(56) References Cited

U.S. PATENT DOCUMENTS

| | | | | |
|---|---|---|---|---|
| 5,681,222 A * | 10/1997 | Hansen | ............ | F16D 3/02 |
| | | | | 464/160 |
| 5,762,556 A * | 6/1998 | Kurian | ............ | F16D 1/0864 |
| | | | | 464/160 |
| 6,533,061 B1 * | 3/2003 | Fairless | ............ | B62D 53/026 |
| | | | | 180/418 |
| 8,672,110 B2 * | 3/2014 | Jaeger | ............ | F16D 7/048 |
| | | | | 192/56.1 |
| 2008/0178714 A1 * | 7/2008 | Gross | ............ | B25B 23/141 |
| | | | | 81/473 |
| 2011/0255914 A1 * | 10/2011 | Bynum | ............ | B25B 23/141 |
| | | | | 403/348 |
| 2012/0064981 A1 * | 3/2012 | Copeland | ............ | F16D 9/06 |
| | | | | 464/33 |
| 2013/0147154 A1 | 6/2013 | Copeland | | |
| 2014/0011598 A1 * | 1/2014 | Wang | ............ | F16D 7/024 |
| | | | | 464/38 |
| 2014/0033882 A1 * | 2/2014 | Wilczek | ............ | B23P 19/065 |
| | | | | 81/474 |

* cited by examiner

DEVICE FOR LIMITING TORQUE AND FARM MACHINE USING SAME

The present invention relates to the field of agricultural machines and relates on one hand to a torque-limiting device, in particular whereof the breaking element shears, and on another hand to an agricultural machine, in particular a harvesting machine, in particular a machine for cutting and conditioning plants such as grass or forage plants.

In this field, harvesting plants consists essentially on one hand of cutting them, and on another hand of conditioning the cut strands to optimize the windrow, in particular its drying. The cutting is done using a cutting unit comprising cutting rotors bearing rotary knives, the cutting rotors rotate around a substantially vertical axis and are mounted next to one another. The conditioning is done by a conditioning unit placed downstream from the cutting unit, and essentially including one or several conditioning rotors. The latter for example include a plurality of blades, fingers or flails, mounted pivoting around a horizontal axis, transverse to the direction of advance of the machine, distributed angularly in parallel vertical planes, aligned along one or several shafts, so as to form a conditioning assembly.

In one configuration in the form of a pulled machine, the setting in motion both of the cutting unit and the conditioning unit takes place from a coupler head connected to a tractor, driven in rotation by the tractor itself and driving a counter shaft extending in a drawbar whereof the rear end is articulated to a chassis supporting the two units, the shaft in turn driving a third shaft ending approximately at a lateral end of these two units.

The cutting unit is traditionally set in motion by the third shaft using a gear placed between them, which drives the first cutting rotor, and by establishing driving of the successive cutting rotors between them, for example a geartrain positioned below the cutting rotors. The conditioning unit for its part is set in motion by a transmission gearbox, extending on the side of the machine and therefore the lateral end of the conditioning unit. This transmission gearbox generally uses belts which, in case of overload or even blockage of the conditioning unit, begin to slip on their pulleys. This results in rapid deterioration of the pulleys, or even a break of the belts, which can damage other parts of the movement transmission line. The corollary of such damage is a significant immobilization time of the machine as well as high repair costs.

This type of overload may occur if a dense bundle of cut plants, a stone, a branch or a tree root arrives in the conditioning unit.

In order to reliabilize the movement transmission done by this gearbox, it is interesting to use a gear transmission in that location. However, in order to limit the bulk and cost of such a transmission, oversizing of these gears must be avoided. Using smaller gears makes it necessary to have a torque-limiting device between that set of gears and the conditioning unit, in order to avoid damaging the gears in case of overload of the conditioning unit.

To that end, the invention first proposes to use, in that location, a torque limiter including a shearing element, of the rod type parallel to the rotation axis.

Nevertheless, the use of such torque limiters has, in this context, a major drawback, since both for sizing reasons of the parts involved in the torque transmission and for bulk reasons, it may be delicate, if not impossible, to access, with the necessary tools, the zone in which it is necessary to operate to change the shearing element after it has broken.

To that end, the invention proposes to arrange, within the torque limiter itself, one of the two lockings required to tighten the bolt corresponding to the shearing element.

The invention thus relates to a torque-limiting device for the secure transmission of a rotation between an inlet baseplate and an outlet baseplate that it has, where the limiting device comprises at least one drive bolt that forms a breaking element by shearing in case of torque exceeding a predetermined threshold, and where the bolt comprises a nut and a screw and has locking parts.

Such a torque-limiting device is in particular known from document U.S. Pat. No. 4,758,109. This known device has a locking element through shape cooperation with a locking part of the bolt, i.e., its nut. This locking element includes a radial slit formed in one of the baseplates, within which the nut of the drive bolt is housed so as to be stopped in rotation therein. If the drive bolt breaks by shearing caused by a drive torque exceeding the predetermined threshold, it is not only necessary to replace the screw whose rod is broken, but also to replace a new nut within the locking element. The repair of the torque-limiting device is thus complicated by the series of several manual operations. In addition, a nut with appropriate dimensions to be inserted into the slit may not be available near the torque-limiting device, which may delay the repair of that device.

The present invention relates to a torque-limiting device not having the aforementioned drawbacks. To that end, the torque-limiting device according to the invention is characterized in that it further has an intermediate baseplate that is driven by the inlet baseplate and which in turn drives the outlet baseplate, the at least one bolt ensures driving of the intermediate baseplate by the inlet baseplate or driving of the outlet baseplate by the intermediate baseplate, the intermediate baseplate has at least one locking element by shape cooperation with a locking part of the bolt, i.e., essentially the nut or the head of the screw of the bolt, to allow it to be mounted with a single screwing tool, of the thin spanner or other type, and the torque-limiting device has a larger number of locking elements than of bolts. Providing a larger number of locking elements than of bolts makes it possible to leave unused nuts in the locking elements assuming the form of housings in the intermediate baseplate. The latter then forms a prefilled loader to quickly form a new bolt. The nuts in reserve are not damaged after the shearing bolt breaks, by the rotation that appears between the intermediate baseplate and the baseplate to which the bolt fastens it. After the screw rod of the complete bolt has broken, it suffices to install a new screw in another nut in reserve without it being necessary to release the nut in which part of the broken rod is still housed. The repair of the torque-limiting device is thus very quick and easy.

The invention also relates to an agricultural machine, in particular to cut and condition plants, having a rotary assembly, in particular for conditioning cut plants, driven by a set of gears.

This machine is characterized in that it comprises a torque-limiting device as described above, mounted between the set of gears at the inlet baseplate and the rotary assembly at the outlet baseplate, and sized to avoid damaging the set of gears in case of blockage of the rotary assembly.

The invention will be better understood thanks to the following description, which describes still other advantages and is related to preferred embodiments, provided as non-limiting examples, and explained in reference to the appended diagrammatic drawings, in which.

The invention therefore relates to a torque-limiting device (1) for the secure transmission of a rotation between an inlet baseplate (2) and an outlet baseplate (3) that it has, where the torque-limiting device (1) comprises at least one drive bolt (5) that forms a breaking element by shearing in case of a torque exceeding a predetermined threshold, and where the bolt (5) comprises a nut and a screw and has locking parts. The locking parts are used to tighten the bolt (5) by screwing and therefore preferably assume the form of a nut and a screw head with hexagonal shapes.

The bolt (5) thus participates in transmitting the torque from the inlet baseplate (2) to the outlet baseplate (3) and shears for that transmission. The bolt (5) therefore takes up its position parallel to the rotation axis. The inlet baseplate (2) is driven by an element outside the torque-limiting device (1), and the outlet baseplate (3) in turn drives a downstream part. The torque-limiting device (1) is thus mounted in a kinematic chain between an upstream part, fastened to the inlet baseplate (2), and a downstream part, fastened to the outlet baseplate (3).

Figure 1:
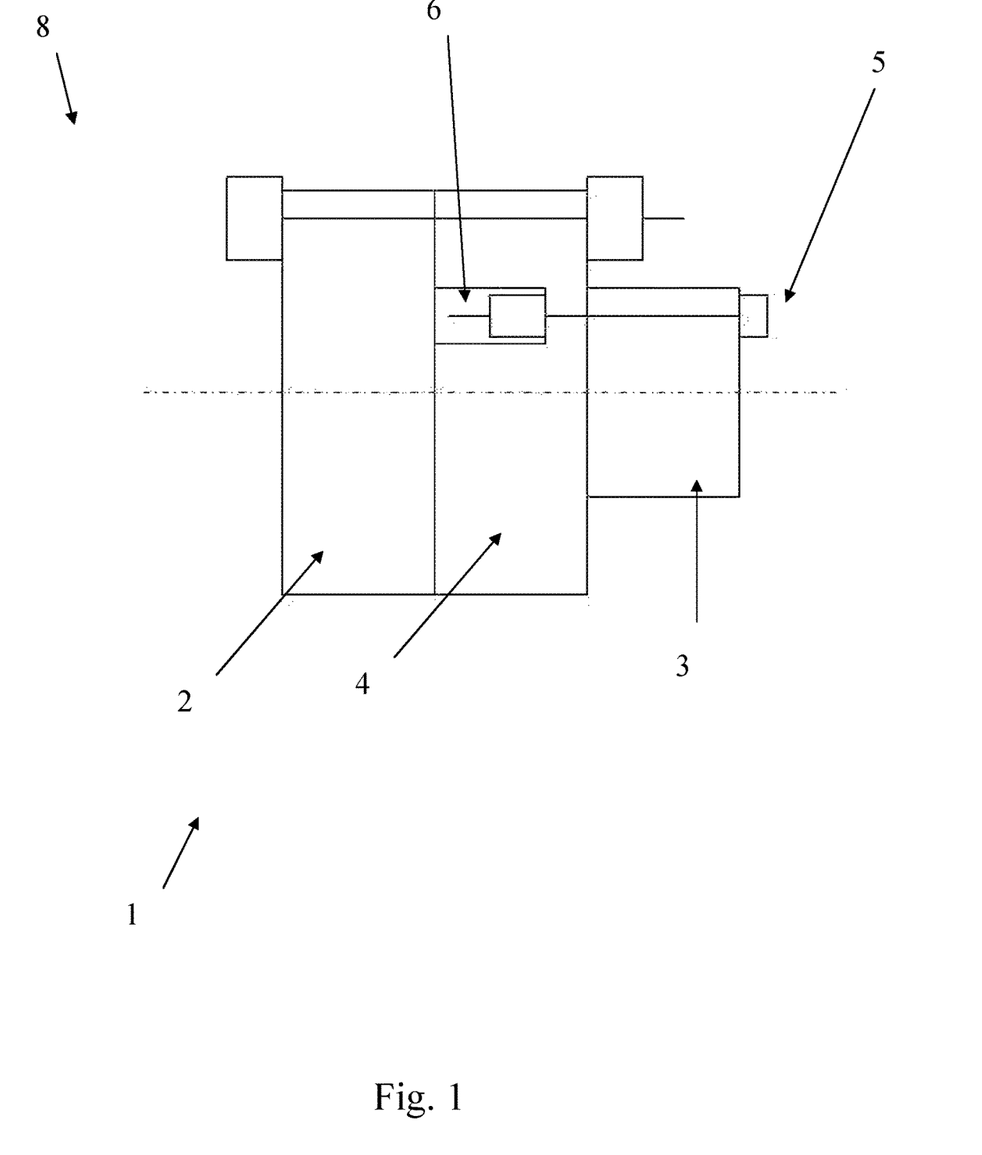
FIG. 1 is a diagrammatic view of a torque-limiting device according to the invention.

The invention is in particular characterized in that the torque-limiting device (1) further has an intermediate baseplate (4) that is driven by the inlet baseplate (2) and that in turn drives the outlet baseplate (3), the at least one bolt (5) ensures the driving of the intermediate baseplate (4) by the inlet baseplate (2) or the driving of the outlet baseplate (3) by the intermediate baseplate (4), the intermediate baseplate (4) has at least one locking element by shape cooperation with a locking part of the bolt (5), i.e., essentially the nut or the head of the screw of the bolt (5), to allow it to be mounted with a single screwing tool. The inlet baseplate (2) and the outlet baseplate (3) are therefore not directly engaged with one another, but by means of an intermediate baseplate (4), set in motion by the inlet baseplate (2) and setting the outlet baseplate (3) in motion. The shearing bolt (5) can then naturally be provided between the intermediate baseplate (4) and the inlet baseplate (2) or between the intermediate baseplate (4) and the outlet baseplate (3). FIG. 1 shows the second possibility.

The invention proposes to arrange, at the heart of the intermediate baseplate (4), at least one housing the geometric shape of which makes it possible to lock part of the bolt (5), preferably its nut, in rotation. Thus, one only has to act on the other locking part of the bolt (5), i.e., preferably the screw head, to successfully tighten the bolt (5) correctly. It is therefore not necessary to have access to both ends of the bolt (5); instead, access to only one end suffices, namely the end beside the inlet baseplate (2). The advantage of providing shape cooperation with the nut rather than the screw head in the intermediate baseplate (4) is, as will be described later, that it is then possible to consider leaving a nut in a cavity of the intermediate baseplate (4).

It is more advantageous to provide shape cooperation in the intermediate baseplate (4) with the nut as locking part than with the head of the screw as locking part.

For the locking part that will be engaged in the intermediate baseplate (4), it is more advantageous to choose the nut of the bolt (5) than to choose the head of the screw. Indeed, it is then possible to leave completely unused nuts in the intermediate baseplate (4), without them being damaged after the shearing bolt (5) breaks, by the rotation that appears between the intermediate baseplate and the baseplate to which the bolt (5) fastens it.

Thus, the locking element preferably assumes the form of a hexagonal housing (6), in which the locking part can be placed.

Furthermore, it may be advantageous to position the at least one bolt (5) closer to the rotation axis of the torque-limiting device (1) than the fastening provided for the intermediate baseplate (4) to set it in motion via the inlet baseplate (2) is positioned. With this configuration, it is in fact difficult to have access to both ends of the bolt (5), since one of them is concealed by the inlet baseplate (2), with larger dimensions than the intermediate baseplate (4).

FIG. 1 shows a fastening of the intermediate baseplate (4) on the inlet baseplate (2) using screwing. Taking into account the function for protecting against excessive torque that must be performed by the bolt (5), calibrated, the fastening between these two baseplates is of course capable of transmitting a higher torque than that at which the bolt (5) breaks. FIGS. 2 to 5 show, however, that the fastening of the inlet baseplate (2) on the intermediate baseplate (4) is done by screws engaged in the intermediate baseplate (4) itself, whereas FIG. 1 illustrates a nut.

The invention is also characterized in that the torque-limiting device (1) has a larger number of locking elements than of bolts (5), the torque-limiting device (1) in particular having a single complete bolt (5) and a plurality of locking elements. Advantageously, a nut is provided in at least one locking element other than that cooperating with the at least one bolt (5), in order to be able to tighten a threaded rod therein to form another bolt (5), without a major disassembly operation. A nut is in particular provided in each locking element other than that cooperating with the at least one bolt (5). Thus, as soon as the bolt (5) breaks, it suffices to install screws in the corresponding nuts. It is only once all of the nuts are engaged by broken threaded rods that it is necessary to disassemble the torque-limiting device (1) to remove them and replace them with a new set of nuts, then next a screw to form a new bolt (5).

According to one possible additional feature, the bolt (5) is mounted between the intermediate baseplate (4) and the outlet baseplate (3), which provides easier access to the head of the screw from the outside of the torque-limiting device (1). Thus, if the bolt (5) breaks considering the resistance of the element driven by the outlet baseplate (3), the intermediate baseplate (4) continues to rotate and the outlet baseplate (3) is stationary. It is then advantageous to provide a lubricant between the contact surfaces of the two baseplates, so as to avoid excessive wear generated by the rotation of only the intermediate baseplate (4) after the bolt (5) has broken before the end of the rotation of the inlet baseplate (2).

Figure 2:
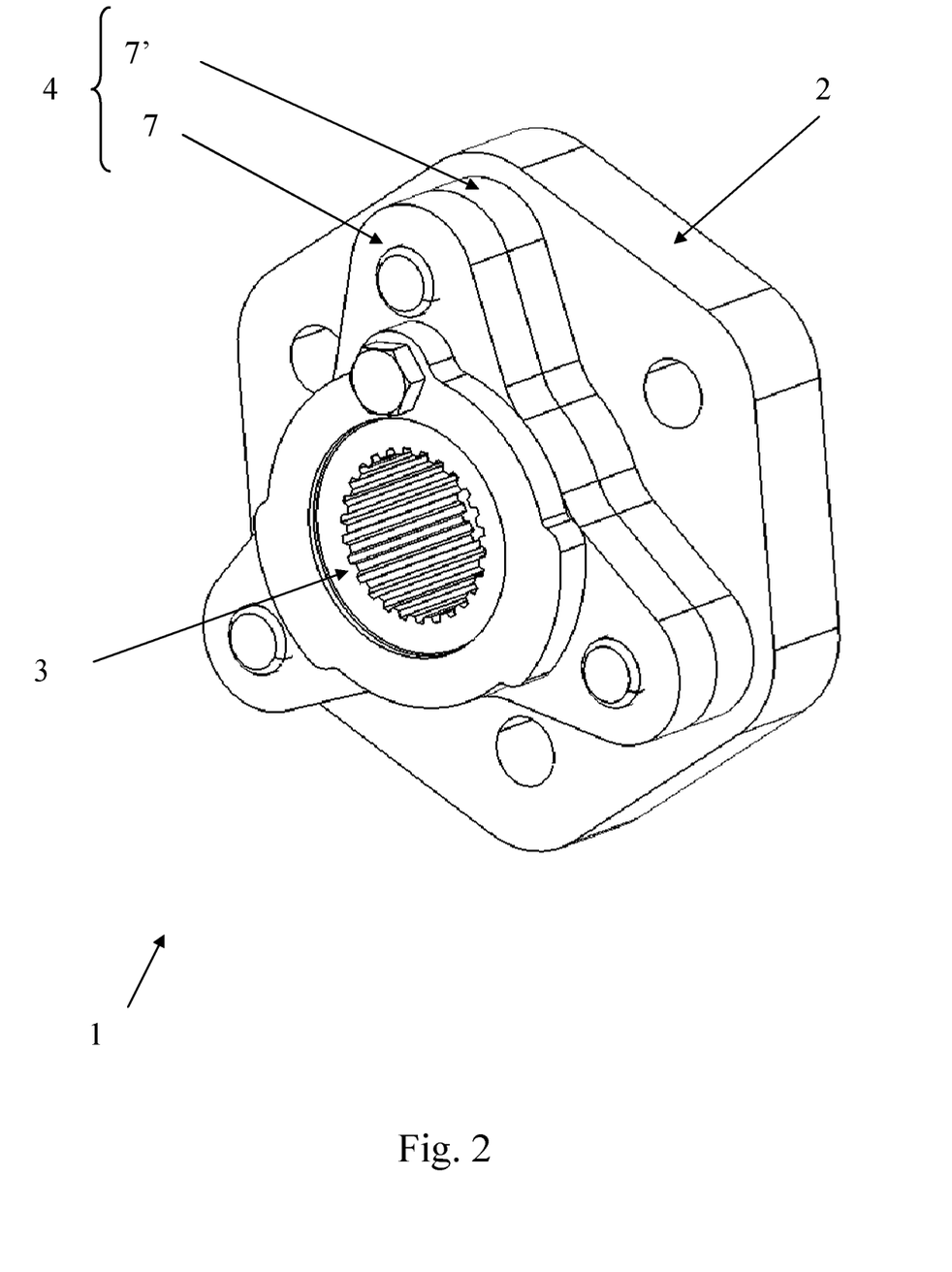
FIG. 2 is a perspective view of a first embodiment.
Figure 3:
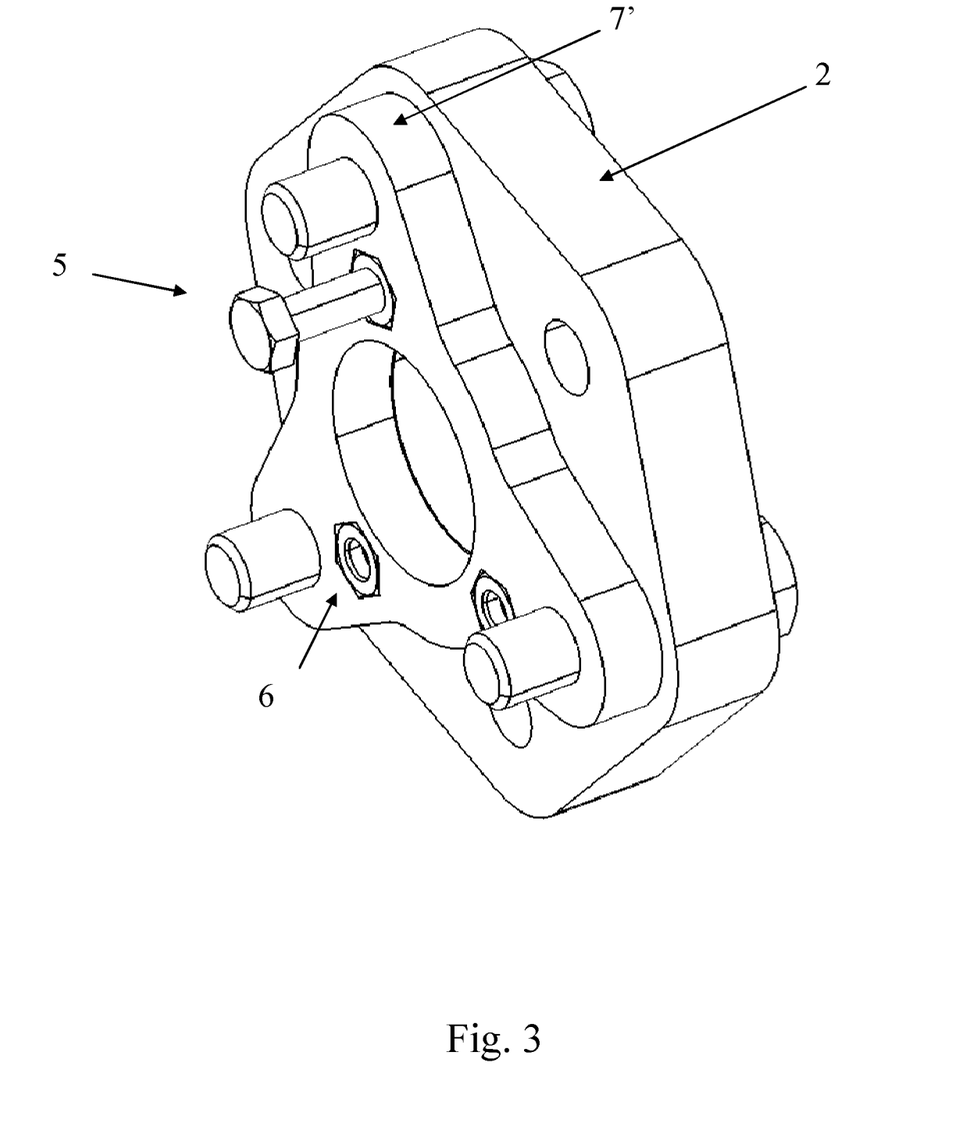
FIG. 3 shows a torque-limiting device that is partially disassembled.

In specific embodiments, and according to one possible additional feature, the locking elements are positioned relative to one another so that when a bolt (5) is engaged in one of them, at least one other locking element is not accessible, while in particular being covered by the outlet baseplate (3), which then only has the number of orifices necessary to leave passage to the number of bolts (5) corresponding to the sizing of the maximum transmissible torque. Thus, it is not possible to increase the maximum transmissible torque by installing more bolts (5) than provided. Increasing the maximum transmissible torque may in fact lead to breaking another element of the kinematic chain, up to the conditioning device. FIGS. 2 and 3 show that, when the set of bolts considered for the maximum transmissible torque is in fact assembled, the outlet baseplate (3) prevents access to the other locking elements, where a locking part is found each time, preferably a nut, to form another bolt (5) in case of break.

Figure 4:
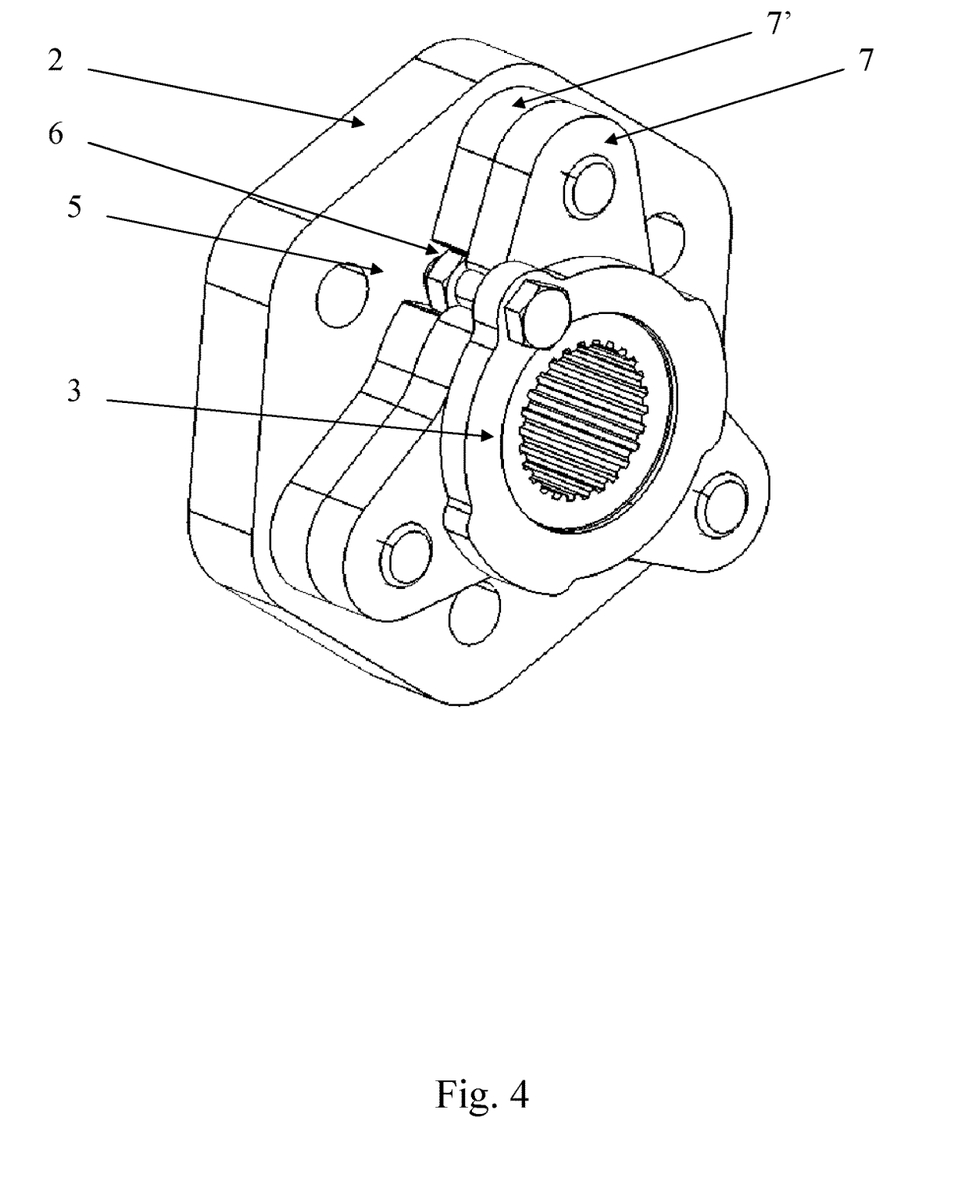
FIG. 4 shows a torque-limiting device according to a second embodiment.

In specific embodiments, in particular illustrated in FIG. 4, at least one locking element emerges at the circumferential surface of the intermediate baseplate (4), such that it is possible to insert, from the side, one and/or the other of the elements of a bolt (5), namely the nut and/or the screw. In the case of FIG. 4, the intermediate baseplate (4) is arranged so that both the nut and the screw can be brought from the side. In absolute terms, such a locking element emerging at the circumferential surface of the intermediate baseplate (4) can converge on the side only to allow a nut to pass, or only to allow a screw to pass. The advantage of such a construction is of course facilitating the placement of the screw and/or the nut, and/or changing broken parts after a bolt (5) has broken. In these embodiments, it is possible to provide maintaining elements, not shown, that maintain the nut of the bolt (5) within the locking element after the bolt (5) has broken. In case of break, these maintaining elements prevent the nut from being ejected radially from its housing under the effect of the centrifugal force.

Figure 5:
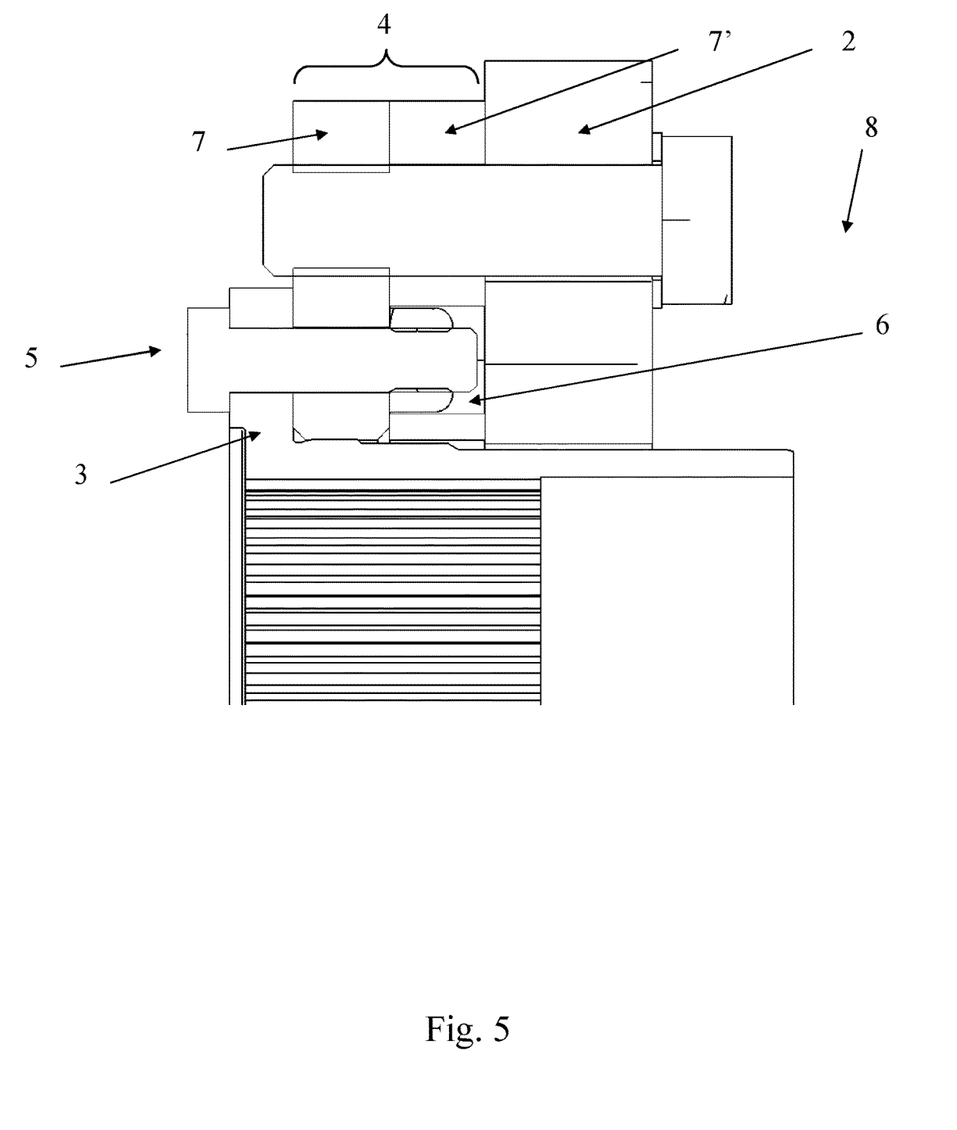
FIG. 5 is a sectional view of a torque-limiting device according to the invention.

According to one possible additional feature, the intermediate baseplate (4) assumes the form of two plates (7, 7') pressed against one another in the direction of the rotation axis of the torque-limiting device (1), one of the plates (7') serves as the housing for a locking part of the bolt (5), namely the nut or the head of the screw, and the other (7) serves both as axial support for the retaining part as well as for the housing of the screw rod. It is thus possible to produce the passage for the screw rod sufficiently precisely on a plate to have control of the shear resistance, and to produce the corresponding locking element in another plate, in particular to produce several or all of the locking elements in another plate, with a less expensive and less precise manufacturing method. FIG. 5 shows that the screw rod of the bolt (5) crosses through the outlet baseplate (3) as well as one of the plates (7), then emerges in the locking element arranged in the other plate (7'). The nut, located in the locking element, arrives against the other plate (7), following the tightening of the screw head of the bolt (5).

Lastly, according to another possible additional feature, the torque-limiting device (1) has an engine's side (8), and the inlet baseplate (2) has screw passage orifices for fastening the baseplate to a driving rotary element positioned on the engine's side (8). The driving of the torque-limiting device (1) therefore takes place from the engine's side (8), the rotary assembly (9), in particular for conditioning, driven by the torque-limiting device (1) also being located on the engine's side (8). Thus, the side opposite the torque-limiting device (1) is accessible for the various necessary maintenance operations. Thus, the intermediate baseplate (4) is pressed against the inlet baseplate (2) and fastened to the latter by screwing accessible for unscrewing from the engine's side (8), as in particular shown in FIG. 5. This figure also shows that the intermediate baseplate (4) is caught between the inlet baseplate (2) and the outlet baseplate (3), and that the outlet baseplate (3):

is fastened to the intermediate baseplate (4) by the at least one bolt (5) accessible for unscrewing from the side opposite the engine's side (8), extends in the direction of the engine's side (8) at a bush that the outlet baseplate (3) has and which is located at least at the heart of the intermediate baseplate (4) in a central orifice, that the intermediate baseplate (4) has to that end, indeed also at the heart of the inlet baseplate (2) in a central orifice that the inlet baseplate (2) also has to that end. The bush is in particular fluted over its inner circumference to drive an output shaft that will be inserted therein.

Figure 7:
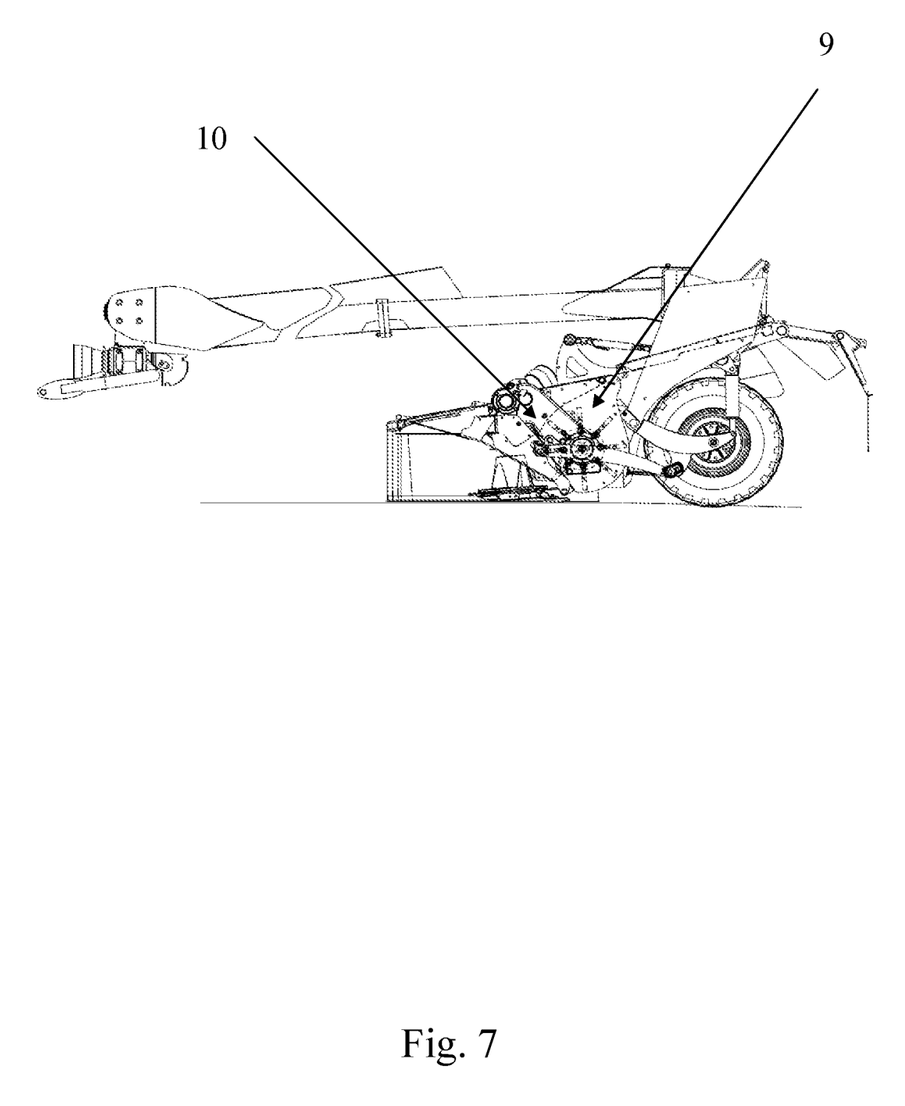
FIG. 7 shows an agricultural machine including a torque-limiting device according to the invention.

The invention also relates to an agricultural machine, in particular for cutting and conditioning plants, having a rotary assembly (9), in particular for conditioning cut plants, driven by a set of gears (10), the set in particular being placed within a lateral gearbox (11), placed on the side of the machine to bring a torque to the rotary assembly (9). It may preferably involve a machine for cutting and conditioning plants, as shown by FIG. 7, designed to be driven by a tractor.

According to the invention, this machine comprises a torque-limiting device (1) for the secure transmission of a rotation between an inlet baseplate (2) and an outlet baseplate (3) that it has, where the torque-limiting device (1) comprises at least one drive bolt (5) that forms a breaking element by shearing in case of a torque exceeding a predetermined threshold, and where the bolt (5) comprises a nut and a screw and has locking parts.

Furthermore, the torque-limiting device (1) is mounted between the set of gears (10) at the inlet baseplate (2) and the rotary assembly (9) at the outlet baseplate (3), and sized to avoid damaging the set of gears (10) in case of blocking of the rotary assembly (9). Such a torque-limiting device (1) therefore operates with a breaking element shearing in the transmission of the torque up to the rotary assembly (9).

The torque-limiting device (1) may also have one or several of the features described above. Thus, in certain specific embodiments of the agricultural machine, the torque-limiting device (1) that it has upstream from the rotary assembly (9) further has an intermediate baseplate (4) that is driven by the inlet baseplate (2), which in turn drives the outlet baseplate (3), the at least one bolt (5) ensures the driving of the intermediate baseplate (4) by the inlet baseplate (2) or the driving of the outlet baseplate (3) by the intermediate baseplate (4), the intermediate baseplate (4) has at least one locking element by shape cooperation with a locking part of the bolt (5), i.e., essentially the nut or the head of the screw of the bolt (5), to allow it to be mounted with a single screwing tool.

In the embodiment illustrated in FIG. 2, the torque-limiting device (1) has an inlet baseplate (2) in the form of a plate set in motion owing to the rotation transmitted from the tractor. The inlet baseplate (2) is thus fastened by screwing to the upstream part of the kinematic chain, and to that end has through holes. The head of a screw placed in one of these holes remains accessible once the torque-limiting device (1) is normally placed on the machine It is therefore completely possible for a repair technician to act on these screw heads from the outside to disassemble the torque-limiting device (1).

The torque-limiting device (1) also has an intermediate baseplate (4), fastened by screwing to the inlet baseplate (2). FIG. 2 shows that in this embodiment, the intermediate baseplate (4) essentially assumes the form of a star with as many branches as there are fastening screws to the inlet baseplate (2), here three, regularly spaced apart. The intermediate baseplate (4) is fastened by screwing to the inlet baseplate (2), at through holes of the inlet baseplate (2). The screws are then preferably mounted such that the heads are located on the side of the inlet baseplate (2), which makes it possible to avoid erroneous disassembly. The intermediate baseplate (4) is essentially made up of two plates (7), (7'), identical in shape and pressed against one another. The interest of using two plates rather than a one-piece intermediate baseplate (4) will also be described below.

The torque-limiting device (1) also comprises an outlet baseplate (3), which assumes the form on one hand of a plane portion, fastened to the intermediate baseplate (4) and against it, the intermediate baseplate (4) being in that location between the inlet baseplate (2) and the outlet baseplate (3), and on another hand a bush shaped portion that extends inside the torque-limiting device (1), from the plane portion toward the inlet baseplate (2). With such a construction, it is possible to arrange a torque limiter whereof the inlet driving and the outlet driving are on the same side, which makes one face of the torque-limiting device (1) completely accessible. The outlet baseplate (3), at its plane portion, is fastened to the intermediate baseplate (4) by at least one bolt (5), the head of the screw of which is shown by FIG. 2. Such a bolt (5) is traditionally made up of a screw and a nut, and it is preferably the hexagonal head of the screw that is accessible from the free face of the torque-limiting device (1). The bolt (5) thus forms the torque-limiting element, shearing at the rod of its screw. In fact, the rod of its screw therefore extends on one hand in the plane part of the outlet baseplate (3), and on another hand in the intermediate baseplate (4), crossing through one (7) of the two plates. The shearing force experienced by the rod of the screw of the bolt (5), and which generates breaking in case of excessive torque, is therefore situated in the plane separating the outlet baseplate (3) on one hand and the intermediate baseplate (4) on another hand.

The head of the screw of the bolt (5) constitutes a locking part, owing to an outer hexagonal shape, compatible with a thin spanner, or an inner hexagonal shape, compatible with a key of the Allen type. The head of the screw thus emerges outside the outlet baseplate (3), to be completely accessible from the free side of the torque-limiting device (1). The other locking part of the bolt (5) essentially consists of a hexagonal nut. This nut is engaged in the intermediate baseplate (4), in a cavity with a corresponding shape, to avoid the rotation thereof. The intermediate baseplate (4) thus ensures the rotational maintenance of the nut, such that the simple maneuvering of the head of the screw suffices to tighten the bolt (5) and firmly secure the intermediate baseplate (4) to the outlet baseplate (3).

It is therefore necessary to guarantee good maintenance of the threaded rod of the bolt (5) in the intermediate baseplate (4), so as to guarantee that the break occurs effectively by shearing, and to be able to calibrate the bolt (5) accordingly.

Producing the intermediate baseplate (4) in the form of two plates (7, 7'), one against the other, then makes it possible to provide one for maintaining the rod of the screw of the bolt, to guarantee the shearing stress, and to provide another to maintain the nut in rotation. The advantage of producing the intermediate baseplate (4) in two plates (7, 7') is then to be able to use different manufacturing methods, for the purpose of arranging a passage for the screw rod in one, and a cavity for the nut in the other.

FIG. 5 also shows that, once the bolt (5) is tightened, the nut, housed in one (7') of the two plates, comes into contact with the other (7), which makes it possible to produce the cavity for the nut with a constant section. Once the intermediate baseplate (4) is mounted on the inlet baseplate (2), the nut is no longer accessible, only the head of the screw is still accessible.

The star configuration of the intermediate baseplate (4) is used again at the outlet baseplate (3), since, as shown by FIG. 2, the bolt (5) is provided in one of the component branches of the intermediate baseplate (4). The bolt (5), the rotation axis of the torque-limiting device (1) and a fastening screw of the intermediate baseplate (4) on the inlet baseplate (2) are therefore aligned. Other geometric configurations are of course possible.

It should also be noted that, although FIG. 2 shows a torque-limiting device (1) with a single bolt (5), it is conceivable that several bolts (5) can be mounted simultaneously.

FIG. 3 shows a particular aspect of this embodiment. The intermediate baseplate (4) has a plurality of housings for nuts, a nut being housed in several of them. It is thus possible to leave at least one unused nut at the heart of the intermediate baseplate (4). After the screw rod of the complete bolt (5) is broken, it will then suffice to install a new screw in another nut, without necessarily releasing the nut in which part of the broken rod is still housed. FIG. 2 shows that the unused nuts are not accessible, which avoids the simultaneous mounting of an excessive number of bolts (5), which would result in increasing the drive torque necessary to break the bolts (5), hence lesser protection provided by the torque-limiting device (1), in particular for the gear transmission.

Owing to the provision of a plurality of cavities for nuts and, furthermore, at least one unused nut, repairs are very simple since after breaking, it suffices to remove the detached part of the bolt (5), shift the outlet baseplate (2) until the screw hole is opposite a nut present in the intermediate baseplate (4), then insert a screw therein to form a new bolt (5). The intermediate baseplate (4) therefore also forms a prefilled loader to form a new bolt (5) quickly. After several successive breaks, when all of the nuts of the torque-limiting device (1) have been used, it will then be necessary to separate the intermediate baseplate (4) from the inlet baseplate (2), so as to be able to dislodge the nuts, part of the rod being screwed therein.

FIG. 4 shows a second embodiment of the invention, which facilitates the placement or change of the nut. FIG. 4 shows that the cavity in which the nut is housed, as well as the cavity that crosses through the screw, emerges on the side of the intermediate baseplate (4), at its outer circumference. Thus, the placement or removal of a nut is made easier inasmuch as it is not done from the rear of the torque-limiting device (1), i.e., from the side of the inlet baseplate (2), but actually from the side of the intermediate baseplate (4).

Figure 6:
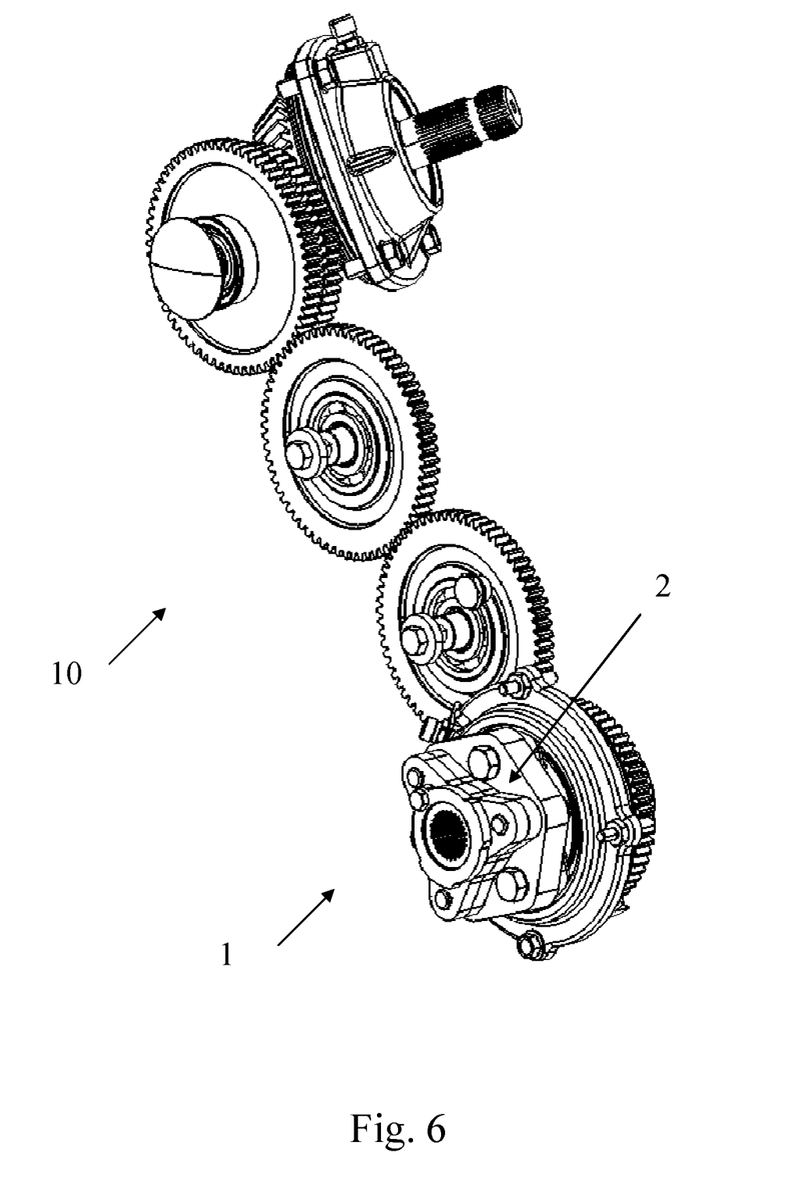
FIG. 6 shows the inside of the transmission gearbox.

FIG. 6 shows the set of gears (10) located in the gearbox. This figure shows that the inlet baseplate (2) is located against the last, lowest gearwheel, the outlet baseplate (3) is located at the other end of the torque-limiting device (1). The gearwheel against which the torque-limiting device (1) is situated is therefore located, relative to the torque-limiting device (1), on the same side as the shaft that the torque-limiting device (1) drives downstream. On the other side of the torque-limiting device (1) is its accessible part, from which maintenance operations can be carried out. The figure illustrates that the disassembly of the torque-limiting device (1), and above all the disassembly of the bolt (5), can both be done from the same side. It also illustrates that the intermediate baseplate (4) is placed directly against the inlet baseplate (2), but also that the bolt (5) is not located at the periphery both of the intermediate baseplate (4) and of the inlet baseplate (2), which prevents easy access to the nut from the rear. Without recourse to the invention, if the bolt (5) breaks, it would be necessary to separate the torque-limiting device (1) from the wheel on which it is mounted, which is possible owing to the screw heads emerging in the front part, then to next separate the inlet baseplate (2) from the intermediate baseplate (4), owing to the access obtained to the heads of the fastening screws with respect to one another, then to change the nut.

With a torque-limiting device (1) according to the invention, the replacement of the breaking parts is very quick and easy, the torque-limiting device (1) further having a small bulk. The use of a general torque-limiting device by shearing to protect the rotary assembly, in particular for conditioning, of an agricultural machine makes it possible to reliabilize the transmission and reduce its bulk.

Of course, the invention is not limited to the embodiments described and shown in the appended drawings. Modifications remain possible, in particular regarding the composition of the various elements, by different combinations of all or part of the features described above, or by substituting technical equivalents, without going beyond the scope of protection of the invention.

The invention claimed is:

1. A torque-limiting device for secure transmission of a rotation between an inlet baseplate and an outlet baseplate, the torque-limiting device comprising:
    a drive bolt that forms a breaking element by shearing in case of a torque exceeding a predetermined threshold, and wherein the bolt comprises a first nut, a screw, and locking parts; and
    an intermediate baseplate that is driven by the inlet baseplate and that in turn drives the outlet baseplate, the bolt ensures driving of the intermediate baseplate by the inlet baseplate or driving of the outlet baseplate by the intermediate baseplate,
    the intermediate baseplate including a first locking element that locks in rotation one of the locking parts of the bolt by shape cooperation, the locking parts of the bolt including, the first nut or a head of the screw of the bolt, to allow the bolt to be mounted with a single screwing tool, and
    the torque-limiting device has a larger number of locking elements than of bolts.

2. The device according to claim 1, wherein the bolt is mounted between the intermediate baseplate and the outlet baseplate.

3. The device according to claim 1, wherein a second nut is provided in a second locking element other than that cooperating with the bolt, to be able to tighten a threaded rod therein to form another bolt.

4. The device according to claim 1, wherein the locking elements are positioned relative to one another so that when the bolt is engaged in one of the locking elements, at least one other of the locking elements is not accessible.

5. The device according to claim 1, wherein the first locking element emerges at a circumferential surface of the intermediate baseplate, such that it is possible to insert, from a side, at least one of the elements of the bolt.

6. The device according to claim 1, comprising an engine's side, and the inlet baseplate includes screw passage orifices to fasten the inlet baseplate to a driving rotary element positioned on the engine's side, the intermediate baseplate is pressed against the inlet baseplate and fastened to the inlet baseplate by screwing and accessible for unscrewing from the engine's side, and is caught between the inlet baseplate and the outlet baseplate, and the outlet baseplate:
    is fastened to the intermediate baseplate by the bolt and accessible for unscrewing from a side opposite the engine's side,
    extends in a direction of the engine's side at a bush of the outlet baseplate and is located at a heart of the intermediate baseplate in a central orifice that the intermediate baseplate includes.

7. An agricultural machine, comprising:
    a rotary assembly driven by a set of gears; and
    the torque-limiting device according to claim 1,
    wherein the torque-limiting device is mounted between the set of gears at the inlet baseplate and the rotary assembly at the outlet baseplate, and sized to avoid damaging the set of gears in case of blockage of the rotary assembly.

8. A torque-limiting device for secure transmission of a rotation between an inlet baseplate and an outlet baseplate, the torque-limiting device comprising:
    a drive bolt that forms a breaking element by shearing in case of a torque exceeding a predetermined threshold, and wherein the bolt comprises a first nut, a screw, and locking parts;
    an intermediate baseplate that is driven by the inlet baseplate and that in turn drives the outlet baseplate, the bolt ensures driving of the intermediate baseplate by the inlet baseplate or driving of the outlet baseplate by the intermediate baseplate; and
    an engine's side, wherein
    the intermediate baseplate includes a first locking element that locks by shape cooperation with one of the locking parts of the bolt, which includes the first nut or a head of the screw of the bolt, to allow the bolt to be mounted with a single screwing tool,
    the torque-limiting device has a larger number of locking elements than of bolts, and
    the inlet baseplate includes screw passage orifices to fasten the inlet baseplate to a driving rotary element positioned on the engine's side, the intermediate baseplate is pressed against the inlet baseplate and fastened to the inlet baseplate by screwing and accessible for unscrewing from the engine's side, and is caught between the inlet baseplate and the outlet baseplate, and the outlet baseplate:
    is fastened to the intermediate baseplate by the bolt and accessible for unscrewing from a side opposite the engine's side,
    extends in a direction of the engine's side at a bush of the outlet baseplate and is located at a heart of the intermediate baseplate in a central orifice that the intermediate baseplate includes.

9. An agricultural machine, comprising:
    a rotary assembly driven by a set of gears; and
    atorque-limiting device for secure transmission of a rotation between an inlet baseplate and an outlet baseplate, the torque-limiting device including:
    a drive bolt that forms a breaking element by shearing in case of a torque exceeding a predetermined threshold, and wherein the bolt comprises a first nut, a screw, and locking parts; and
    an intermediate baseplate that is driven by the inlet baseplate and that in turn drives the outlet baseplate, the bolt ensures driving of the intermediate baseplate by the inlet baseplate or driving of the outlet baseplate by the intermediate baseplate, wherein the intermediate baseplate includes a first locking, element that locks by shape cooperation with one of the locking parts of the bolt, which includes the first nut or a head of the screw of the bolt, to allow the bolt to be mounted with a single screwing tool, and the torque-limiting device has a larger number of locking elements than of bolts, wherein the torque-limiting device is mounted between the set of gears at the inlet baseplate and the rotary assembly at the outlet baseplate, and sized to avoid damaging the set of gears in case of blockage of the rotary assembly.

* * * * *